United States Patent
van Diggelen (12)

(10) Patent No.: US 6,411,892 B1
(45) Date of Patent: Jun. 25, 2002

(54) METHOD AND APPARATUS FOR LOCATING MOBILE RECEIVERS USING A WIDE AREA REFERENCE NETWORK FOR PROPAGATING EPHEMERIS

(75) Inventor: Frank van Diggelen, San Jose, CA (US)

(73) Assignee: Global Locate, Inc., San Jose, CA (US)

( * ) Notice: Subject to any disclaimer, the term of this patent is extended or adjusted under 35 U.S.C. 154(b) by 0 days.

(21) Appl. No.: 09/615,105

(22) Filed: Jul. 13, 2000

(51) Int. Cl.[7] .................................................. G06F 7/00
(52) U.S. Cl. .................... 701/207; 342/357.09; 701/215
(58) Field of Search ................................. 701/207, 213, 701/214, 215; 342/352, 357.01, 357.02, 357.03, 357.04, 357.05, 357.06, 357.09, 357.12, 357.15

(56) References Cited

U.S. PATENT DOCUMENTS

| | | | |
|---|---|---|---|
| 5,781,156 A | 7/1998 | Krasner | 342/357 |
| 5,812,087 A | 9/1998 | Krasner | 342/357 |
| 5,825,327 A | 10/1998 | Krasner | 342/357 |
| 5,831,574 A | 11/1998 | Krasner | 342/357 |
| 5,841,396 A | 11/1998 | Krasner | 342/357 |
| 5,874,914 A | 2/1999 | Krasner | 342/357 |
| 5,884,214 A | 3/1999 | Krasner | 701/207 |
| 5,945,944 A | 8/1999 | Krasner | 342/357.06 |
| 5,999,124 A | 12/1999 | Sheynblat | 342/357.09 |
| 6,002,363 A | 12/1999 | Krasner | 342/357.1 |
| 6,016,119 A | 1/2000 | Krasner | 342/357.06 |
| 6,052,081 A | 4/2000 | Krasner | 342/357.02 |
| 6,061,018 A | 5/2000 | Sheyblat | 342/357.06 |
| 6,064,336 A | 5/2000 | Krasner | 342/357.05 |
| 6,215,441 B1 | 4/2001 | Moeglein et al. | 342/357.01 |

FOREIGN PATENT DOCUMENTS

WO    WO 99/56144    11/1999    ............. G01S/5/14

Primary Examiner—William A. Cuchlinski, Jr.
Assistant Examiner—Edward Pipala
(74) Attorney, Agent, or Firm—Moser, Patterson & Sheridan, LLP

(57) ABSTRACT

A method and apparatus for distribution and delivery of global positioning system (GPS) satellite telemetry data using a communication link between a central site and a mobile GPS receiver. The central site is coupled to a network of reference satellite receivers that send telemetry data from all satellites to the central site. The mobile GPS receiver uses the delivered telemetry data to aid its acquisition of the GPS satellite signal. The availability of the satellite telemetry data enhances the mobile receiver's signal reception sensitivity.

18 Claims, 7 Drawing Sheets

METHOD AND APPARATUS FOR LOCATING MOBILE RECEIVERS USING A WIDE AREA REFERENCE NETWORK FOR PROPAGATING EPHEMERIS

BACKGROUND OF THE INVENTION

1. Field of Invention

The present invention relates to signal processing in GPS receivers. In particular, the present invention relates to a method and apparatus for delivering satellite data to GPS receivers to enable a GPS receiver to acquire and lock on to GPS satellite signals in low signal strength environments (e.g., indoors).

2. Description of the Background Art

Conventional GPS receivers require an inordinate amount of time to acquire and lock onto the satellite signals. Then, once locked, a GPS receiver extracts telemetry data (almanac and ephemeris) from the signal. From these data the GPS receiver can calculate information that enhances its ability to lock onto the satellite signal. A relatively high signal strength satellite signal is necessary to enable the system to achieve an initial lock. Once the GPS signal is acquired, the signal strength must remain high while the almanac and/or ephemeris data is extracted from the satellite signal. Any severe attenuation of the signal can cause a loss of lock and the signal will require re-acquisition. As such, the system has an inherent circularity that makes it difficult or impossible for GPS receivers to acquire signals in low signal strength environments.

To aid initial acquisition of the satellite signal, many GPS receivers store a copy of the almanac data, from which the expected Doppler frequency of the satellite signal can be calculated. Several techniques have been developed to calculate useful information at a separate GPS receiver and then transmit this data to another GPS receiver. U.S. Pat. No. 6,064,336, issued May 16, 2000, collects almanac data at a separate GPS receiver, then transmits the almanac data to a mobile receiver. The mobile receiver then uses the almanac data to compute the expected Doppler frequency of the satellite signal, thus aiding in initial signal acquisition.

The advantage of receiving the almanac is that each GPS satellite repeatedly transmits a complete almanac containing orbit information for the complete GPS constellation, thus a single GPS receiver, tracking any satellite, can collect and propagate the almanac for all satellites in the constellation. The disadvantage of using the almanac is that it is a fairly rough model of the satellite orbit and satellite clock errors, thus the almanac is only useful in reducing the frequency uncertainty and cannot be used to enhance receiver sensitivity by reducing the search window of code-delay uncertainties.

If a GPS receiver had a complete set of ephemeris data for all satellites in view, before said receiver attempted to lock onto those satellites, the receiver would have significantly improved acquisition times and enhanced sensitivity. This is because the ephemeris data contains an accurate description of the satellite position, velocity, and clock errors; and the GPS receiver can use this data to increase its sensitivity by reducing significantly the search windows for frequency uncertainty and code-delay uncertainty. The disadvantage of the ephemeris is that each satellite only transmits its own ephemeris; thus a single GPS receiver cannot collect and propagate ephemeris for all the satellites in the constellation.

Therefore there is a need in the art for a GPS receiver system that propagates satellite ephemeris for all satellites in the constellation, thereby enhancing the speed of acquisition and signal sensitivity of mobile receivers.

SUMMARY OF THE INVENTION

The invention comprises a method and apparatus for distribution and delivery of the Global Positioning System (GPS) satellite ephemeris using a communication link between a central site and a wide area network of GPS receivers. The wide area network of GPS receivers collects the ephemeris data that is transmitted by the satellites and communicates the data to the central site. The central site delivers the ephemeris to the mobile receiver. The mobile GPS receiver uses the delivered data to enhance its sensitivity in two ways. First, the data allows the receiver to detect very weak signals that the receiver would not ordinarily be able to detect, and second, the GPS receiver does not have to track the satellite signals for very long before a position can be calculated.

In one embodiment of the invention, the satellite ephemeris data is retransmitted without manipulating the data in any way. The GPS receiver may then use this data exactly as if the receiver had received the data from the satellite. In another embodiment, a satellite pseudo-range model is computed at the central site from the ephemeris data, and this pseudo-range model is transmitted to the GPS receiver. The pseudo-range model has the characteristic that the model is more concise than the complete ephemeris. As such, the GPS receiver does not have to perform as many calculations when using the pseudo-range model as when using the complete ephemeris.

BRIEF DESCRIPTION OF DRAWINGS

The teachings of the present invention may be readily understood by considering the following detailed description in conjunction with the accompanying drawings, in which.

DETAILED DESCRIPTION OF THE INVENTION

To facilitate understanding, the description has been organized as follows:

Overview, introduces each of the components of the invention, and describes their relationship to one another.

Global Tracking Network, describes how a worldwide network of tracking stations is constructed and deployed to ensure that all satellites are tracked at all times.

Ephemeris Processing, describes an embodiment of the invention that provides a more compact, and simpler, model of the satellite ephemeris.

Signal Detection, describes how the retransmitted satellite ephemeris data is used in a GPS receiver to detect signals that would otherwise be undetectable.

Sensitivity Enhancement, describes how the two strongest satellite signals may be used to compute the time and correlator offset at the mobile receiver. This information is, in turn, used to enhance sensitivity for weaker GPS signals that are received by the mobile receiver.

OVERVIEW

Figure 1:
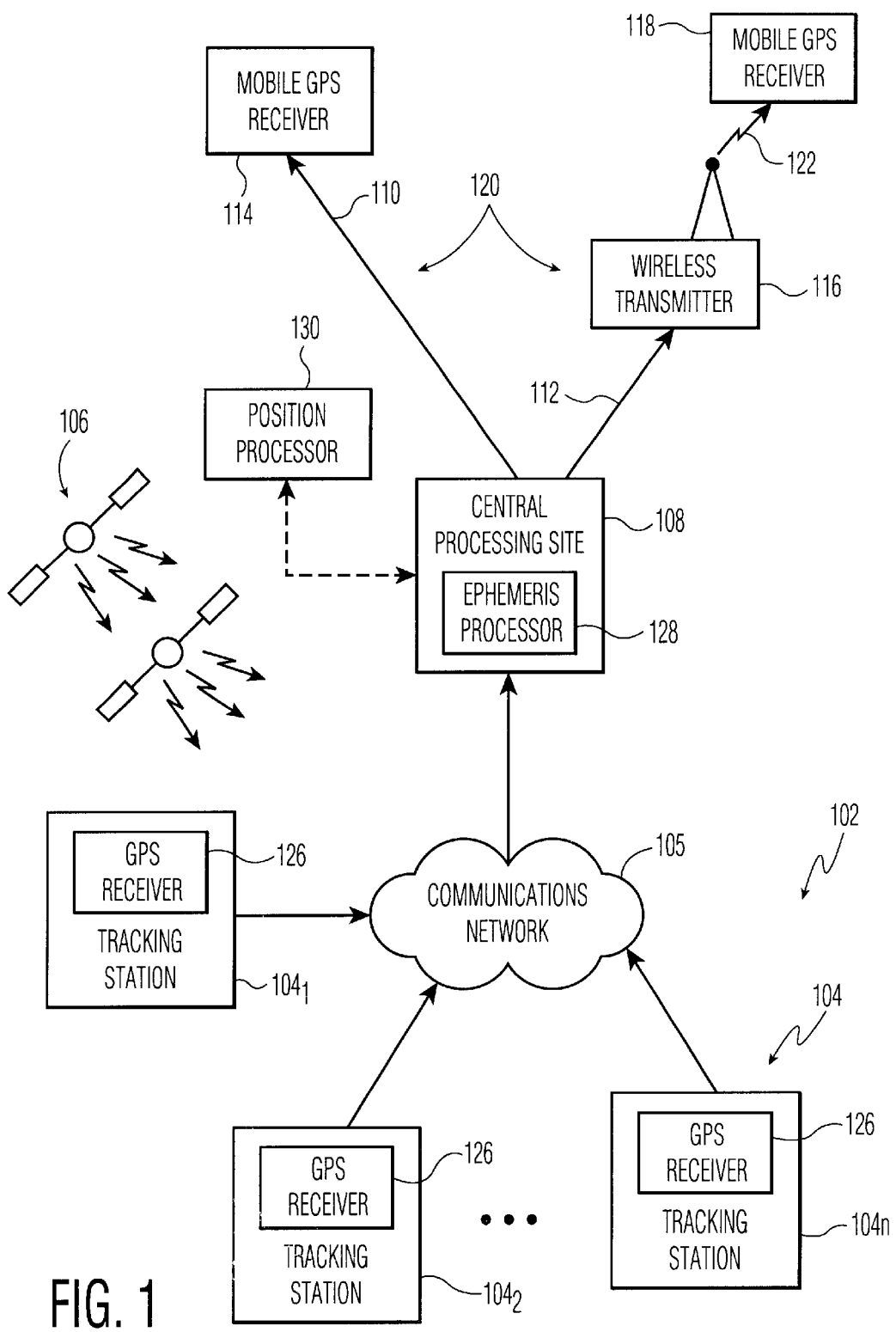
FIG. 1 depicts an architecture for a wide area reference station network in accordance with the present invention.

FIG. 1 depicts one embodiment of a global positioning system (GPS) satellite data distribution system 100 comprising:

a) A reference station network 102 comprising a plurality of tracking stations $104_1, 104_2, \ldots 104_n$ coupled to one another through a communications network 105. The reference stations 104 are deployed over a wide area and contain GPS receivers 126 so that ephemeris may be collected from all satellites 106 within a global network of satellites e.g., the global positioning system (GPS). Ephemeris information comprises a 900 bit packet containing satellite position and clock information.

b) A central processing site 108 that collects the ephemeris from the tracking stations 104 comprises an ephemeris processor 128 that removes duplicate occurrences of the same ephemeris, and provides the latest ephemeris data for redistribution to mobile GPS receivers 114 and 118.

c) A communications link 120 from the central processing site to the mobile GPS receiver 114. The link 120 may be a landline 110, or other direct communications path, that couples the mobile GPS receiver 114 directly to the central processing site 108. Alternatively, this link may have several parts, for example: a landline 112 to a wireless transmitter 116, and a wireless link 122 from the transmitter 116 to a mobile receiver 118.

d) A mobile GPS receiver 114 or 118 that uses the redistributed ephemeris data (or a modified form thereof) to aid the receiver in detecting GPS signals from satellites 106 in a satellite constellation.

e) A position processor 130, where the position of a GPS receiver 114 or 118 is calculated. This could be the GPS receiver itself, the central processing site 108, or some other site to which the mobile GPS receivers send the measurement data that has been obtained from the satellites 106.

In operation, each of the satellites 106 continually broadcast ephemeris information associated with a particular satellite. To comprehensively and simultaneously capture the ephemeris data of all the satellites 106 in the constellation, the network 106 is spread worldwide.

To obtain all the ephemeris data, three or more tracking stations 104 are needed. Each of the 28 satellites has an orbit inclined at 55 degrees relative to the equator of the earth. As such, no satellite ever travels outside of a plus or minus 55 degree range on an orbital sphere. Consequently, three stations placed 120 degrees apart and lying exactly on the equator of the earth, would have all the satellites in view. However, placing reference stations at or close to those exact locations on the equator is impractical. To place reference stations in large cities around the world, a realistic, minimum number that will achieve viewing of all the satellites 106 is four.

Each of the tracking stations 104 contains a GPS receiver 126 that acquires and tracks satellite signals from all satellites 106 that are in view. The stations 104 extract the ephemeris information that uniquely identifies the position of each satellite as well as satellite clock information e.g., a 900 bit packet with a GPS signal. The ephemeris information is coupled to the central processing site 108 via, for example, a terrestrial land line network 105.

The central processing site 108 sends all or part of the ephemeris information to one or more mobile GPS receivers 114 and 118. If the central processing site knows the approximate position of the mobile GPS receiver, the central processing site 108 may only send the ephemeris information for satellites that are presently (or about to be) in view of the mobile GPS receiver 114 or 118. The ephemeris information can be coupled directly through a land line 110 or other communication path (e.g., internet, telephone, fiber optic cable, and the like). Alternatively, the ephemeris information can be coupled to a mobile GPS receiver 118 through a wireless system 116 such as a cell phone, wireless Internet, radio, television, and the like. The processing and utilization of the ephemeris information is described below (see EPHEMERIS PROCESSING and SIGNAL DETECTION).

GLOBAL TRACKING NETWORK

The global GPS reference network 102 has stations 104 arranged such that all satellites are in view all the time by the tracking stations 104 in the network 102. As such, the ephemeris for each satellite 106 is available to the network in real time, so that the network, in turn, can make the ephemeris, or derived pseudo-range models, available to any mobile receiver that needs them.

Figure 3:
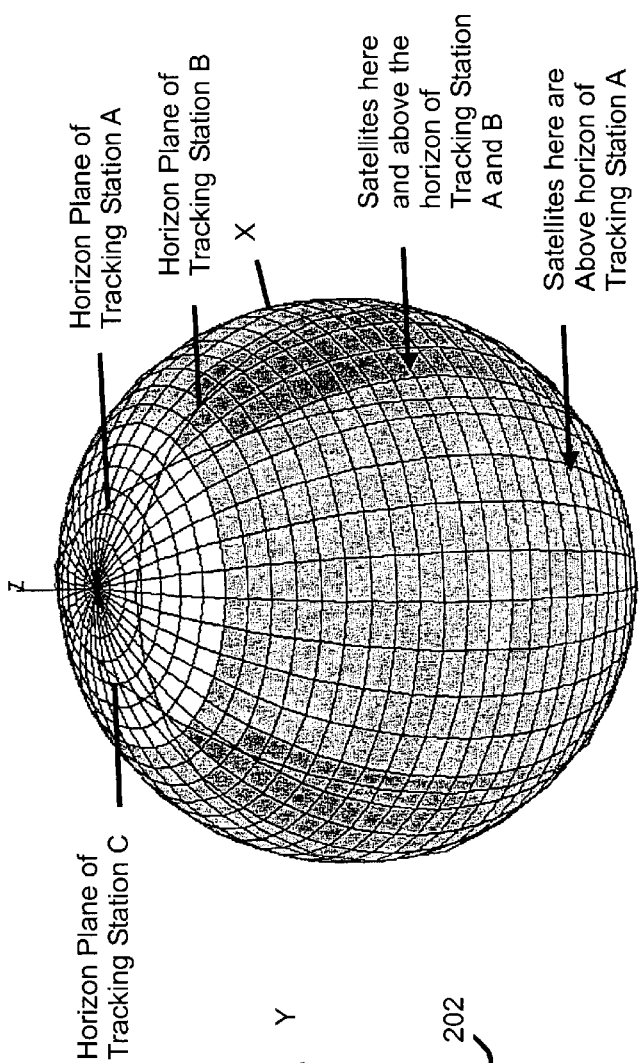
FIG. 3 depicts the intersection of the GPS orbital sphere and the horizon planes of three reference stations.
Figure 2:
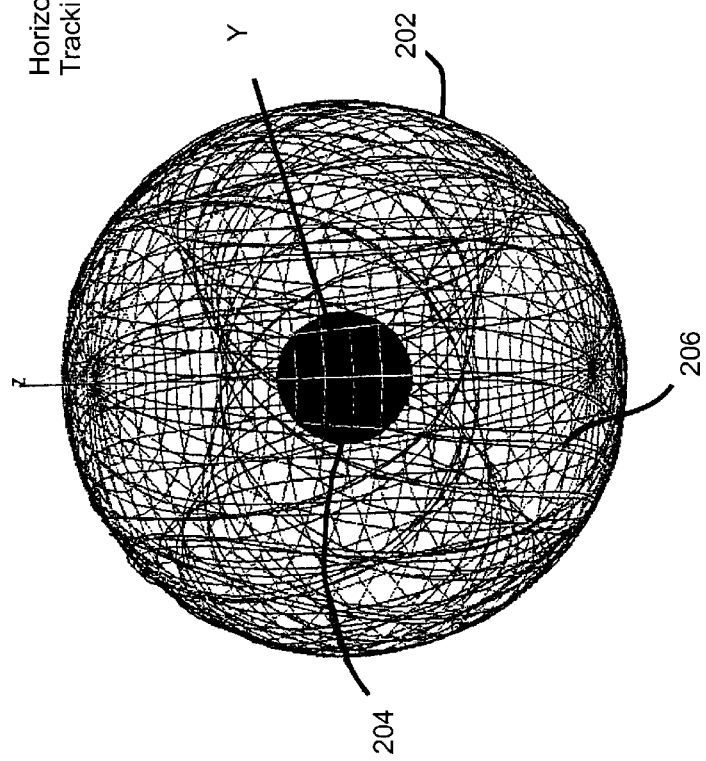
FIG. 2 depicts a GPS orbital sphere.

The minimum complete network of reference stations comprises three stations, approximately equally placed around the earth, on or close to the equator. FIG. 2 shows the GPS orbital sphere 202 surrounding the earth 204, and an indication 206 of all orbits of the satellites. FIG. 3 shows the intersection of the horizon planes of 3 tracking stations, (denoted A, B, and C), with the GPS orbital sphere. In FIG. 3, the orbital sphere is shaded gray in any region above the horizon of a tracking station. Regions on the orbital sphere above the horizons of two tracking stations are shaded slightly darker. The orbital sphere is white in the regions, above and below 55 degrees, where there are no GPS satellites. From FIG. 3, it is clear that any point on any GPS orbit is always above the horizon of at least one reference station A, B or C.

Figure 4A:
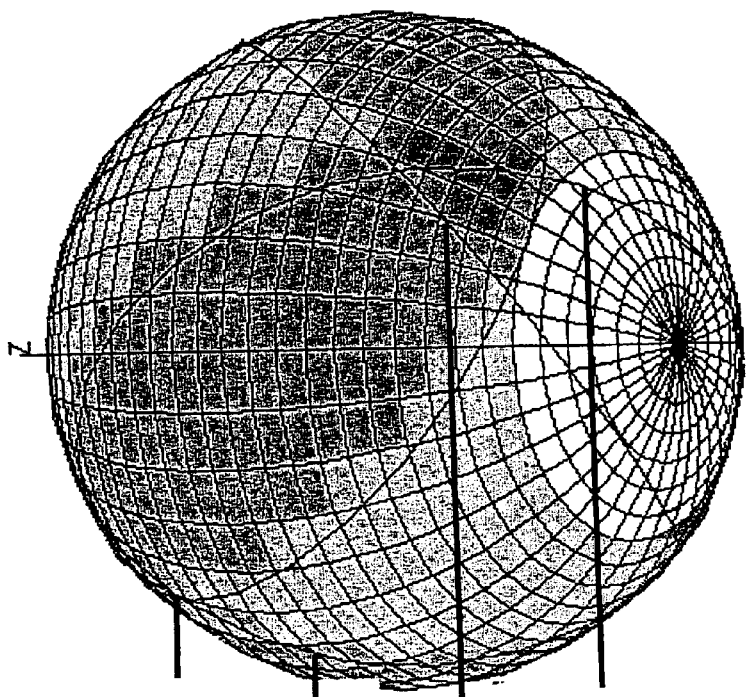
FIGS. 4A and 4B depict the intersection of the GPS orbital sphere and the horizon planes of four reference stations.
Figure 4B:
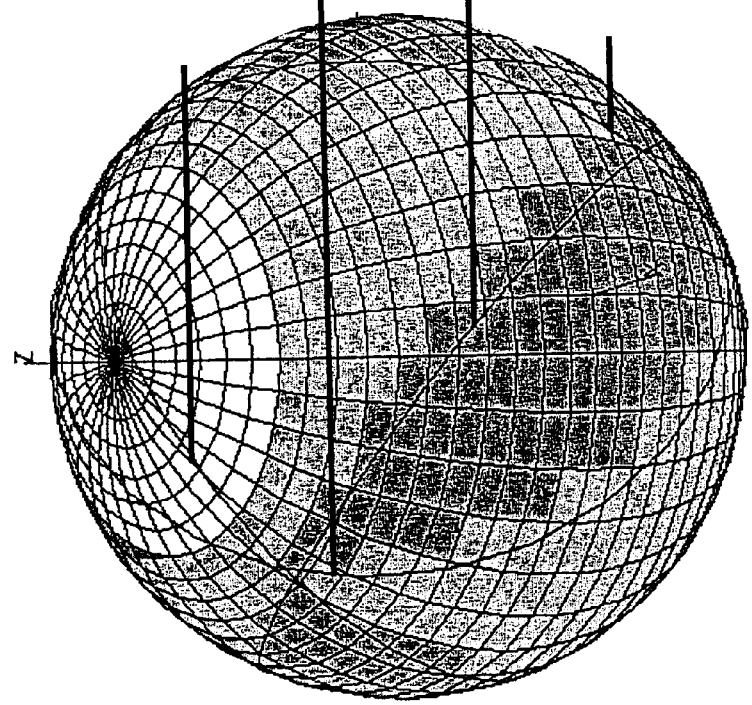

It is not commercially or technically practical to place reference stations around the equator. Preferred sites are major cities with good communications infrastructure to enable the ephemeris to be coupled to the control processing site via a reliable network. When the reference stations are moved away from the equator, more than three stations are needed to provide coverage of all satellites all the time. However, it is possible to create a network of only four reference stations with complete coverage of all GPS satellites all the time, and with the four stations located in or near major cities. For example, the stations may be placed in Honolulu, Hi. (USA), Buenos Aires (Argentina), Tel Aviv (Israel) and Perth (Australia). FIGS. 4A and 4B show the intersection of the horizon planes of these stations with the GPS orbital sphere. Any point of any GPS orbit is always above the horizon of at least one of the reference stations. FIGS. 4A and 4B show the orbital sphere viewed from two points in space, one point (FIG. 4A) in space approximately above Spain, and the other (FIG. 4b) from the opposite side of the sphere, approximately above New Zealand. The figure is shaded in a similar way to FIG. 3. Gray shading shows regions of the GPS orbital sphere above the horizon of at least one tracking station and darker gray regions represent portions of the orbital sphere accessible to two stations.

EPHEMERIS PROCESSING

The ephemeris is used to compute a model of the satellite pseudo-range and pseudo-range rate. From the pseudo-range rate the mobile GPS receiver can calculate the Doppler frequency offset for the satellite signal. The computation of the pseudo-range model can be done at the mobile receiver, or at the central processing site. In the preferred embodiment the pseudo-range model is computed at the central site as follows.

Figure 5:
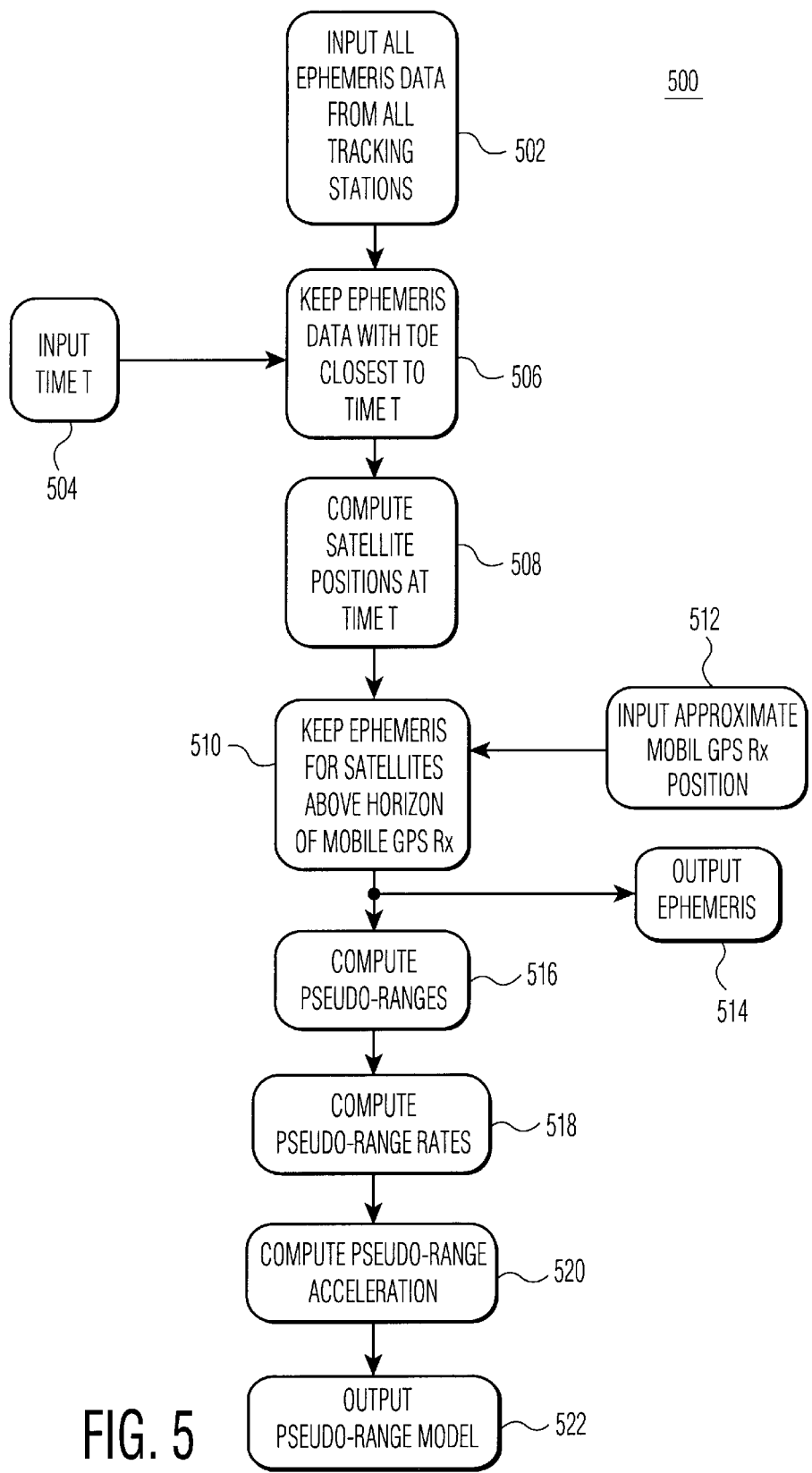
FIG. 5 depicts a flow diagram of a method of generating pseudo-range models.

FIG. 5 depicts a flow diagram of a method 500 for generating a pseudo-range model. At step 502, the ephemeris data from all the tracking stations is brought to the central processing site. Ephemeris data is transmitted continually by all satellites, mostly this is repeated data; new ephemeris is typically transmitted every 2 hours. The ephemeris is tagged with a "Time of Ephemeris", denoted TOE. This tag indicates the time at which the ephemeris is valid. Ephemeris calculations are highly accurate within 2 hours of TOE. A satellite first transmits an ephemeris 2 hours ahead of the TOE, thus any ephemeris is highly accurate for a maximum of four hours.

At step 506, the central processing site keeps all the ephemeris data with TOE closest to the time T at which the mobile receiver requires ephemeris (or a pseudo-range model). Time T is provided by the mobile receiver at step 504. Usually T will be the current real time, however, it could be a time up to 4 hours in the future for mobile receivers that are collecting ephemeris/pseudo-range models in advance of when they need them. T could also be a time in the past, for mobile receivers processing previously stored data.

At step 508, the central processing site then calculates the satellite positions at time T. In the preferred embodiment, this is performed using the equations provided in the GPS Interface Control Document, ICD-GPS200-B.

At step 512, the central processing site obtains the approximate position of the mobile GPS Receiver. In the preferred embodiment, the mobile GPS receiver communicates with the central processing site over a wireless communications link, such as a 2-way paging network, or a mobile telephone network, or similar 2-way radio networks. Such 2-way radio networks have communication towers that receive signals over a region of a few miles. The central processing site obtains the reference ID of the radio tower used to receive the most recent communication from the mobile GPS. The central processing site then obtains the position of this radio tower from a database. This position is used as the approximate mobile GPS position.

In an alternative embodiment, the approximate position of the mobile GPS receiver may be simply the center of the region served by a particular communications network used to implement this invention.

In another alternate embodiment, the approximate position of the mobile GPS receiver may be the last known point of said receiver, maintained in a database at the central processing site.

It is understood that many combinations and variants of the above methods may be used to approximate the mobile GPS receiver position.

Having calculated the satellite positions, and obtained the approximate user position, the central processing site computes (at step 510) which satellites are, or will soon be, above the horizon at the mobile GPS receiver. For applications requiring simply the redistribution of the ephemeris data, at step 514, the central processing site now outputs the ephemeris for those satellites above, or about to rise above, the horizon.

In the preferred embodiment, a pseudo-range model is computed that comprises: time T, and, for each satellite above, or about to rise above, the horizon: the satellite PRN number, pseudo-range, pseudo-range rate, and pseudo-range acceleration.

To compute a pseudo-range model, the central processing site first computes at step 516 the pseudo-ranges of all satellites above, or about to rise above, the mobile GPS receiver horizon. The pseudo-range is the geometric range between the satellite and the approximate GPS position, plus the satellite clock offset described in the ephemeris.

At step 518, the pseudo-range rate may be computed from the satellite velocity and clock drift. Satellite velocity may be obtained directly by differentiating the satellite position equations (in ICD-GPS-200-B) with respect to time. In an alternative embodiment, satellite velocity may be computed indirectly by computing satellite positions at two different times, and then differencing the positions.

In another alternative embodiment, the pseudo-range rates may be computed indirectly by computing the pseudo-ranges at two different times, and then differencing these pseudo-ranges.

At step 520, the pseudo-range acceleration is then computed in a similar fashion (by differentiating satellite velocity and clock drift with respect to time, or by differencing pseudo-range rates).

The complete pseudo-range model is then packed into a structure and output to the mobile GPS receiver at step 522.

The mobile GPS receiver may use the pseudo-range model for the period of validity of the ephemeris from which it was derived. To apply the pseudo-range model at some time after time T, the mobile receiver propagates the pseudo-ranges and range rates forward using the rate and acceleration information contained in the pseudo-range model.

In an alternative embodiment, the central processing site propagates the unaltered ephemeris 519 and the derivation of the pseudo-range model and pseudo-range rate is performed at the mobile GPS receiver.

Krasner (U.S. Pat. No. 6,064,336) has taught that the availability of Doppler information can aid the mobile GPS receiver by reducing the frequency uncertainty. U.S. Pat. No. 6,064,336 describes a system and method for delivering to a mobile receiver Almanac information from which Doppler may be derived; or for delivering equivalent information, derived from the Almanac; or for delivering the Doppler measurement itself from a base station near to the mobile receiver. In another alternative embodiment of the current invention, the Ephemeris may be used to derive Doppler information. In the section that follows (SIGNAL DETECTION) it will be appreciated that the use of this Doppler information will aid in signal acquisition to the extent of reducing the Pseudo-range rate uncertainty, i.e., the number of frequency bins to search, but the Doppler information will not reduce the Pseudo-range uncertainty (i.e. the code delays).

SIGNAL DETECTION

There are several ways in which the availability of ephemeris data (or the derived pseudo-range model) aid the signal acquisition and sensitivity of the mobile GPS receiver, described below.

The ephemeris or pseudo-range models can predict the elevation angle to the satellite, allowing the receiver to focus on acquiring high elevation satellite signals, which are generally less subject to obstruction. Satellites that are calculated to be below the horizon (negative elevation angles) can be ignored. This satellite selection can also be performed using an almanac of satellite orbital information, but providing models, or ephemeris from which models can be created, eliminates the need for non-volatile storage for the almanac within the mobile receiver. Thus, the ephemeris provides some advantage in this respect, however the main advantage of the invention is in the improvement in signal acquisition and receiver sensitivity, described below.

The "re-transmitted" or "re-broadcast" ephemeris information improves the operation of the mobile receiver in two ways.

First, the mobile receiver does not need to collect the ephemeris from the satellite. The ephemeris is broadcast from a satellite every 30 seconds and requires 18 seconds to transmit. In order to receive ephemeris without the use of the present invention, a mobile receiver needs clear, unobstructed satellite reception for the entire 18-second interval during which the ephemeris is being transmitted. Depending on the environment and usage of the receiver, it may be minutes before the situation allows the ephemeris to be collected and in many applications, for example, indoor use, the mobile receiver may never have an unobstructed view of a satellite. To eliminate the data collection delay, the present invention provides the ephemeris data directly to the mobile receiver.

Second, the ephemeris is used, as described above, to form the pseudo-range models of the satellite signals being received at the mobile receiver. These models can accelerate the acquisition process in several ways.

The models predict the pseudo-range and pseudo-range rate of the received signals. If the approximate user position is fairly accurate, these models will be very accurate in estimating the pseudo-range and pseudo-range rate. Using the models, the receiver can focus the correlation process around an expected signal.

Figure 6:
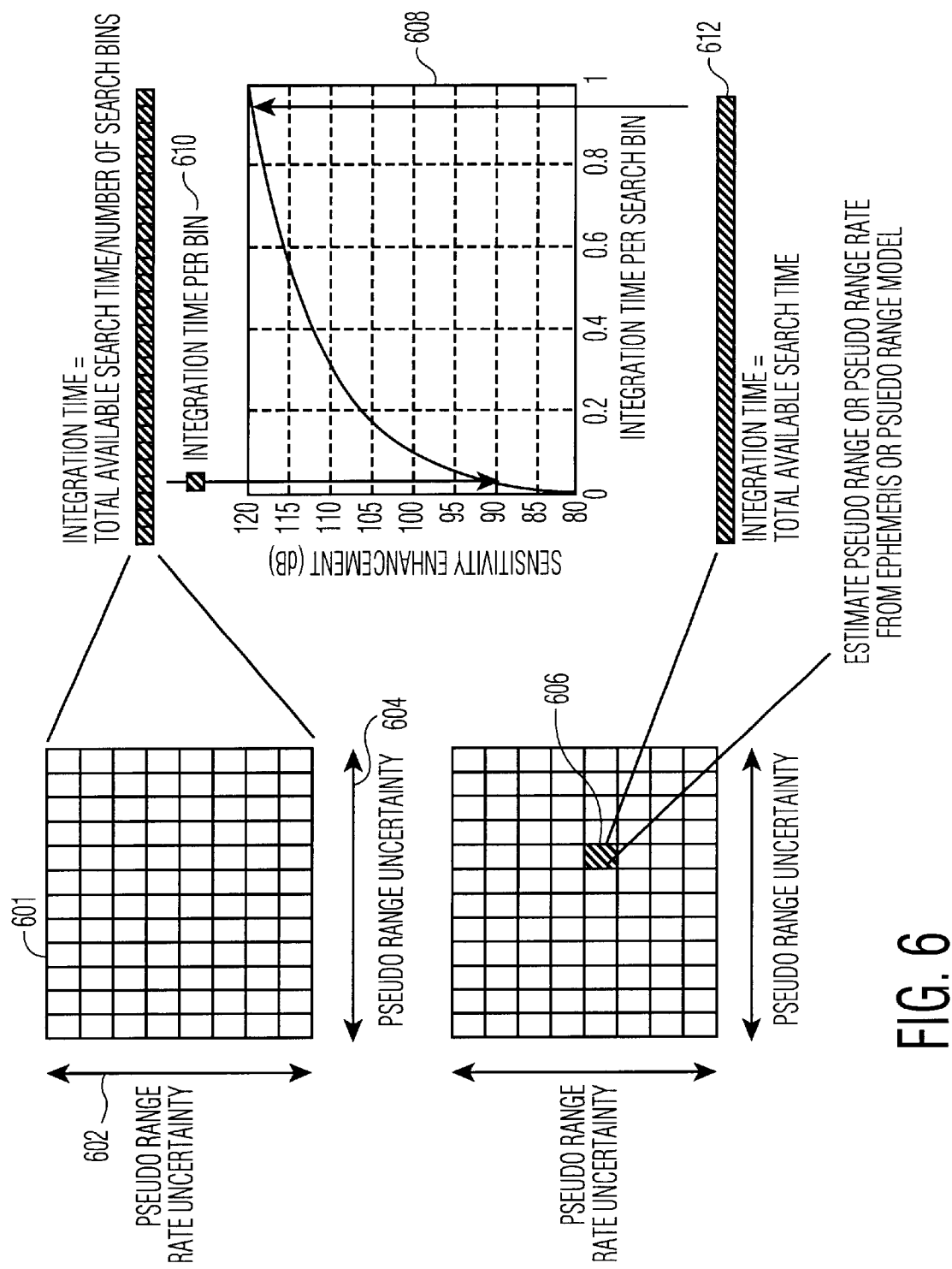
FIG. 6 is a graph illustrating the timing (pseudo-range) and frequency (pseudo-range rate) uncertainty for a mobile GPS receiver, and the improvement in sensitivity that is gained by reducing both these uncertainties.

FIG. 6 shows a graph 601 that illustrates the usual frequency and timing uncertainty for a mobile GPS receiver. On the y-axis 602, the various rows show different pseudo range rates, and on the x-axis 604 the various columns show different pseudo ranges. Without an accurate model, such as available using the present invention, the possibilities for range rates will vary considerably because a wide range of satellite motions are possible, and the possibilities for ranges will also vary over many cycles of the PN codes. With an accurate model provided by the ephemeris information, the uncertainties can be reduced to a small range, depicted by the black cell 606. Many receivers will be able to search this small range in a single pass that eliminates a time consuming sequential search and allows the use of longer integration times for better sensitivity, as will now be described.

Better sensitivity is achieved as follows: The sensitivity of a GPS receiver is a function of the amount of time that the receiver can integrate the correlator outputs. The relationship between sensitivity and integration time is shown by the graph 608. With many bins to search, the integration time 610 equals the total available search time divided by the number of search bins. With only a single bin to search, the integration time 612 equals the total available search time, increasing the sensitivity as shown 608.

It should be noted that in some receivers, the pseudo-ranges and pseudo-range rates that can be predicted from the pseudo-range models will not be accurate because of a lack of synchronization of the local clock. In this case, a search over a wide range of uncertainties will still be initially required, but only for the strongest satellite(s). If the local clock is known to be correct to within approximately one second of GPS time then any one satellite will be enough to synchronize the local correlator offset. Thereafter, the expected pseudo-range and pseudo-range rates can be accurately computed for the remaining satellites. If the local clock is not known to within approximately one second, then two satellites must be used to compute the two required clock parameters: the local clock and the correlator offset. The fact that two satellites are required is an often misunderstood point. In the GPS literature, it is often mentioned that one satellite is enough to solve for an unknown clock offset without realizing that this is only true for systems where the local clock is already approximately synchronized with GPS time. In traditional GPS receivers that continuously track the GPS signals, the local clock is synchronized to GPS time to much better than one second accuracy. In some more modern implementations (e.g., U.S. Pat. No. 6,064,336), the local clock is synchronized to a network time reference, which is synchronized to GPS time. However, the current invention is specifically intended to operate in implementations where the local clock is not synchronized to GPS time. The manner in which one solves for these clock parameters is described in detail below.

Once the unknown clock parameters have been computed, the parameters can then be used to adjust the pseudo-range models for the remaining, weaker satellites to reduce the range of uncertainty back to a narrow region; thus enhancing sensitivity precisely when high sensitivity is needed, i.e., for detecting the weaker satellite signals.

In other receivers, the local clock and clock rate may be quite accurate. For example, if the clock signals are derived from a wireless media that is synchronized to GPS timing (e.g., a two-way paging network), then the clock parameters are typically accurate. In this case, there is no clock effect and a narrow search region can be used from the onset.

To quantify the benefits of the invention, consider an example where the user position is known to within the radius of reception of a 2-way pager tower (2-miles). In this case the pseudo-range (expressed in milliseconds) can be pre-calculated to an accuracy of one-hundredth of a millisecond. Without the invention, a GPS receiver would search over a full millisecond of all possible code delays to lock onto the code transmitted by the satellite. Using the invention the search window is reduced by up to one hundred times, making the GPS receiver faster, and, more importantly, allowing the use of longer integration times (as described above), making the receiver capable of detecting weaker signals, such as occur indoors.

An additional advantage of having ephemeris, or the derived pseudo-range model, at the mobile receiver is that the process of identifying the true correlation is more robust, since, apart from increasing the integration time as described above, the chance that a "false peak" would be identified is greatly reduced by considering only correlations that occur within the expected range.

Figure 7:
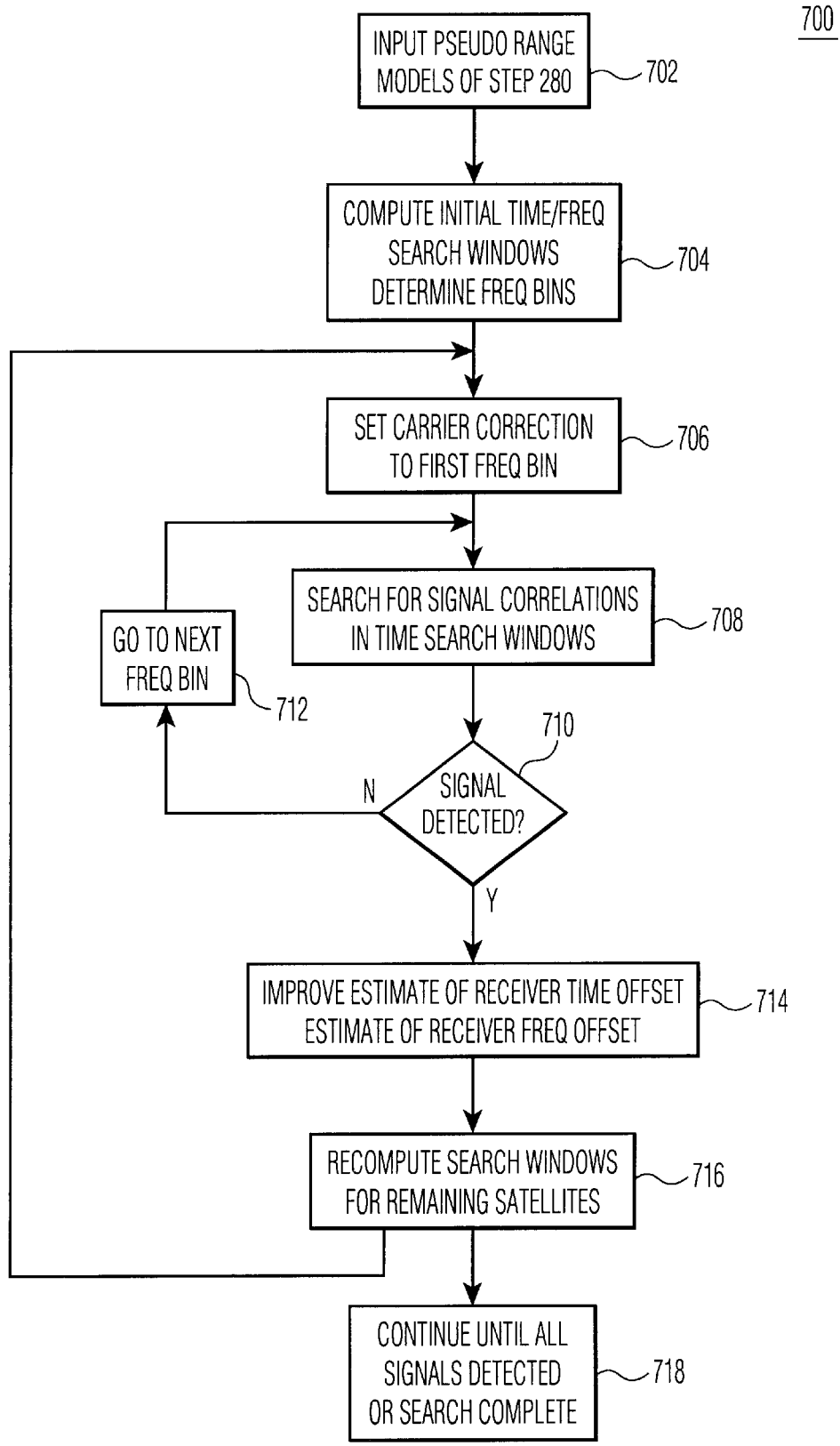
FIG. 7 depicts a flow diagram of a method of searching through the time (pseudo-range) and frequency (pseudo-range rate) windows.

One embodiment of the use of ephemeris (or derived pseudo-range models) to enhance sensitivity is described further with respect to FIG. 7.

FIG. 7 is a flow diagram of a method 700 of signal search. The method begins at step 702 with an input of the pseudo-range model. As noted earlier this pseudo-range model is calculated from the ephemeris, either at the mobile receiver itself, or at the central processing site. At step 704, the model is applied at the current time in the mobile device and is used to estimate the expected current frequency and timing of GPS satellite signals, as well as the expected uncertainties of these quantities, to form a frequency and code delay search window for each satellite. This window is centered on the best estimates of frequency and delay but allows for actual variations from the best estimates due to errors in the modeling process including inaccuracies in the rough user position, errors in the time and frequency transfer from the wireless carrier etc. In addition, the frequency uncertainty is divided into a number of frequency search bins to cover the frequency search window. As shown in FIG. 6, the number of search bins is dramatically reduced by using the pseudo-range model.

In step 706, the detection and measurement process is set to program the carrier correction to the first search frequency. At step 708, a code correlator is invoked to search for signal correlations within the delay range of the delay window. Such a code correlator is standard in the art, but the present invention dramatically reduces the number of possible code delays over which the correlator must search thereby increasing the integration time for each code delay, and thus the sensitivity of the receiver.

At step 710, the method 700 queries whether a signal is detected. If no signal is detected, the carrier correction is set, at step 712, to the next search frequency and the search continues until a signal is found or the frequency search bins are exhausted.

If, at step 710, the method 700 affirmatively answers the query, the signal is used at step 714 to further improve the estimate of clock time delay and clock frequency offset. This information is utilized at step 716 to re-compute the frequency and delay search windows for the remaining undetected satellites. In step 718, the process continues until all satellites have been detected or the search windows have been exhausted.

The method of FIG. 7 is illustrative of one of a variety of algorithms that can be used to guide the search process based on the GPS signal processing's ability to estimate time and frequency. Additionally, the algorithms could be altered to include various retry mechanisms since the signals themselves may be fading or blocked.

SENSITIVITY ENHANCEMENT

To enhance the sensitivity of the receiver (as described with respect to FIG. 6), the invention uses the approximate position of the mobile device to compute expected pseudo-range, this reduces the pseudo-range uncertainty. However, before the inventive receiver can compute the expected pseudo-range the following three items are required:

1. the approximate position of the mobile device (to within a few miles of a true position)
2. the approximate time at the mobile device (to within approximately one second of the true time)
3. the correlator clock offset at the mobile device (to within a few microseconds of the true offset).

The more accurately each of the three terms is known, the more precisely the invention can bound the pseudo-range uncertainty, and thus the greater the sensitivity (see FIG. 6). In the preferred embodiment, the approximate position of the mobile device is determined from the known location of the radio tower last used by the device. The radius of reception of radio towers for 2-way pagers and cell-phones is typically 3 kilometers. Thus the approximate position of the mobile device is known to within 3 kilometers, and the induced error on the pseudo-range estimate will be no more than 3 kilometers. With reference to FIG. 6., note that the full pseudo-range uncertainty for an unaided GPS receiver is equal to one code epoch, which is approximately 300 kilometers. Thus, even knowing an approximate position as roughly as 3 kilometers can reduce the pseudo-range uncertainty one hundred times.

The timing errors also induce errors on the expected pseudo-range. To compute expected pseudo-range, the receiver must calculate the satellite position in space. The satellite range from any location on earth varies at a rate between plus and minus 800 meters per second. Thus each second of time error will induce a range error (and pseudo-range error) of up to 800 meters.

The mobile device correlator delay offset induces a direct error in the pseudo-range measurement, as is well known in the GPS literature. Each microsecond of unknown correlator delay offset induces 300 meters of error in the range measurement.

Thus, to keep the pseudo-range estimate within a range of a few kilometers (as illustrated in FIG. 6), the receiver of the present invention requires estimates of position, time and correlator delay offset in the ranges shown above.

In an implementation where the real time at the mobile device is not known to better than a few seconds, and the correlator delay offset is not known, one solves for both using two satellite measurements, as follows.

The equation relating pseudo-range errors to the two clock errors is:

$$y = c*dt_c - \text{rangeRate}*dt_s \quad (1)$$

where:
- y is the "pseudo-range residual", i.e., the difference between the expected pseudo-range and the measured pseudo-range;
- c is the speed of light;
- $dt_c$, is the correlator delay offset; and
- $dt_s$, is the offset of the real time estimate.

Figure 8:
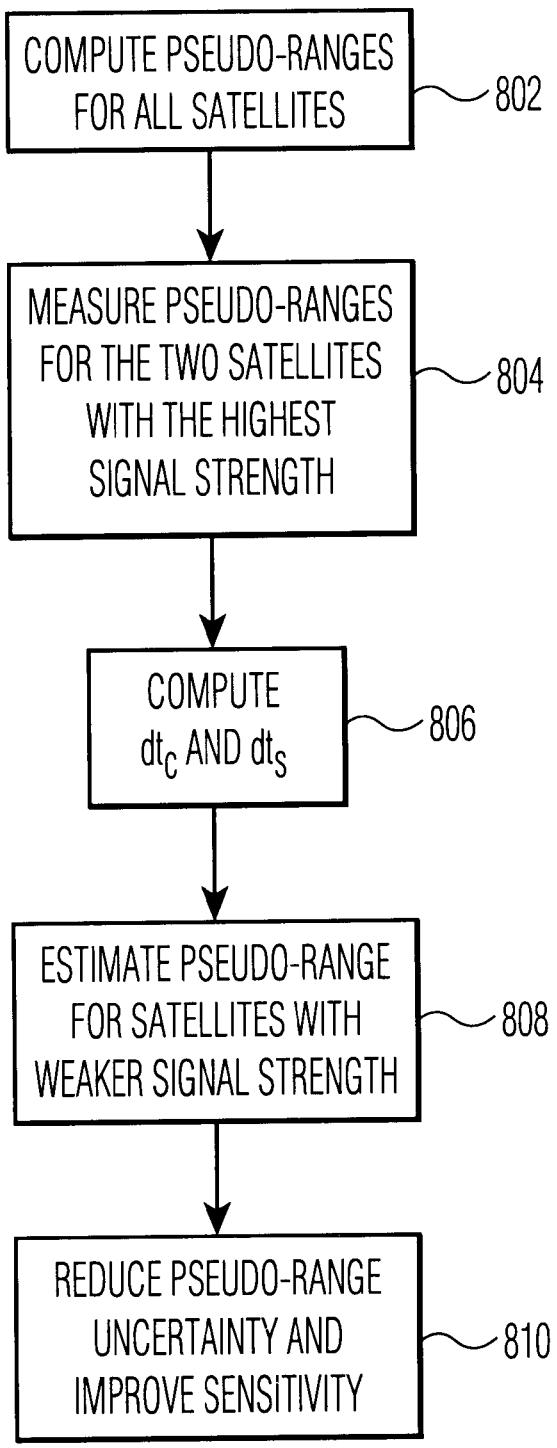
FIG. 8 depicts a flow diagram of a method for using pseudo-range information of satellites having high signal strength to improve receiver sensitivity for signals received from satellites having low signal strength.

FIG. 8 depicts a flow diagram of a method 800 for improving the clock parameters, and then improving the receiver sensitivity. Method 800 comprises:

Step 802. Using the best known clock parameters, compute expected pseudo-ranges for all the satellites.

Step 804. Measure the pseudo-ranges for the two strongest satellites with the highest signal strength.

Step 806. Using these two measurements, solve equation (1) for the two unknowns: $dt_c$, and $dt_s$.

Step 808. Use $dt_c$ and $dt_s$ to improve the estimate of the expected pseudo-ranges for the remaining (weaker) satellites.

Step 810. Use these improved expected pseudo-ranges to reduce the pseudo-range uncertainty, thus improving the sensitivity of the receiver, as shown in FIG. 6.

Although various embodiments which incorporate the teachings of the present invention have been shown and described in detail herein, those skilled in the art can readily devise many other varied embodiments that still incorporate these teachings.

What is claimed is:

1. A method for locating position comprising:

receiving satellite telemetry data from all of the satellites in a global positioning system constellation of satellites using only four receiving stations;

communicating the received satellite telemetry data to a central processing site;

propagating selected satellite telemetry data to a mobile receiver; and acquiring at least one satellite signal at said mobile receiver using said selected satellite telemetry data.

2. The method of claim 1 wherein the selected satellite telemetry data comprises the ephemeris data for each satellite in view of the mobile receiver.

3. The method of claim 2 wherein the selected satellite data comprises a pseudo-range model, derived from the ephemeris data, that represents a relative position of each satellite in view of the mobile receiver.

4. The method of claim 2 wherein the selected satellite telemetry data comprises a Doppler measurement derived from the satellite ephemeris data.

5. The method of claim 1 wherein said acquiring step further comprises:

using the selected satellite telemetry data to narrow a frequency uncertainty and a code uncertainty.

6. The method of claim 1 further comprising:

computing a position of said mobile receiver using said selected satellite data.

7. The method of claim 6 wherein said computing step is performed within the mobile receiver.

8. The method of claim 6 wherein said computing step is performed at a location that is remote from said mobile receiver.

9. The method of claim 1 wherein said at least on satellite signal is a signal having a high signal strength and said acquiring step further comprises:

using the at least one acquired satellite signal to aid in receiving other satellite signals having low signal strength.

10. The method of claim 9 wherein said at least one acquired satellite signal is used to generate a clock and a correlator delay offset.

11. The method of claim 9 wherein said at least one acquired satellite signal is used to improve an estimated pseudo-range computation for satellite signals having low signal strength.

12. The method of claim 1 further comprising using at least one additional receiving station to provide signal reception redundancy.

13. Apparatus for locating a position of a mobile receiver comprising:

four satellite signal receivers for receiving satellite signals from all satellites in a constellation of global positioning satellites;

a communications network, coupled to each of said satellite signal receivers in said four satellite signal receivers;

a satellite data processor, coupled to said communications network; and a mobile receiver, coupled to said satellite data processor.

14. The apparatus of claim 13 further comprising a wireless network for communicating said satellite data to said mobile receiver.

15. The apparatus of claim 13 wherein said satellite data processor generates a pseudo-range model for each mobile receiver and communicates the pseudo-range model to the mobile receiver.

16. The apparatus of claim 13 wherein said plurality of satellite signal receivers are positioned to receive telemetry data from each and every satellite in a satellite constellation.

17. The apparatus of claim 13 wherein said satellite constellation is a global positioning system (GPS) satellite constellation.

18. The apparatus of claim 13 further comprising at least one additional satellite signal receiver for providing signal reception redundancy.

* * * * *